Feb. 9, 1971 J. JANSEN ET AL 3,562,033
METHOD OF DOPING SILICON WITH GROUP III SUBSTANCE
Filed Feb. 12, 1968
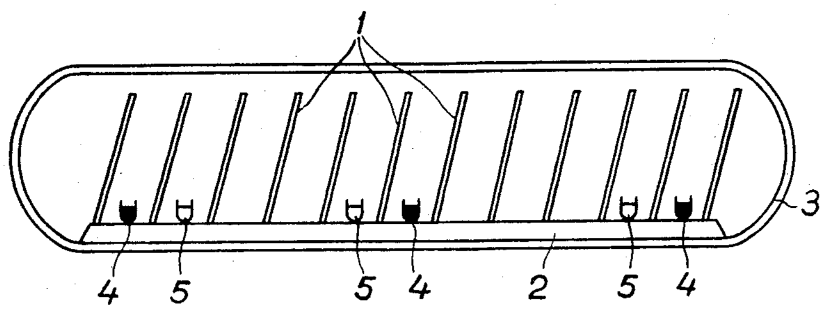
INVENTOR.
JURI JANSEN
LENNART RYMAN
BY
Jennings Bailey, Jr

United States Patent Office 3,562,033

Patented Feb. 9, 1971

3,562,033
METHOD OF DOPING SILICON WITH GROUP III SUBSTANCE

Juri Jansen, Vasteras, and Lennart Ryman, Grangesburg, Sweden, assignors to Allmänna Svenska Elektriska Aktiebolaget, Vasteras, Sweden, a corporation of Sweden

Filed Feb. 12, 1968, Ser. No. 704,928
Claims priority, application Sweden, Feb. 13, 1967, 1,949/67
Int. Cl. H01l *7/36, 7/44*
U.S. Cl. 148—189 5 Claims

ABSTRACT OF THE DISCLOSURE

Method of diffusing a doping substance from group III of the periodic system into silicon discs for semi-conductor devices, in which the silicon discs are subjected both to the action of vapor from the doping substance and to the action of a halogen.

BACKGROUND OF THE INVENTION

(1) Field of the invention

The invention relates to the diffusion of a doping substance from group III of the periodic system into silicon discs of semi-conductor devices.

(2) The prior art

In order to effect a thin p-conducting layer in silicon discs for semi-conductor devices such as thyristors, diodes and transistors, it is usual to diffuse into the silicon disc a substance from group III in the periodic system, usually gallium or boron.

The diffusion process is normally carried out by arranging the silicon discs in a quartz ampule which is closed after a piece of the doping substance has been inserted in the quartz ampule. The ampule is then heated in a furnace to a temperature sufficiently high for the doping substance to be vaporized.

SUMMARY OF THE INVENTION

According to the present invention it has been found possible to considerably improve the performance of semi-conductors having a p-conducting layer diffused into the silicon discs. According to the invention the minority carrier life time in n-conducting layers adjacent to p-conducting layers is considerably improved which, for a diode, produces considerably improved reverse characteristics, for a thyristor considerably improved reverse and blocking characteristics and for a transistor improved amplification and reduced leakage currents.

The present invention relates to a method of diffusing a doping substance from group III of the periodic system into silicon discs for semi-conductor devices, in which the silicon discs are arranged in a container and subjected to the action of vapor from the doping substance, which is characterised in that during treatment with the doping substance the silicon discs are also subjected to the action of a halogen.

A feasible explanation of the favourable effect achieved according to the invention is that the halogen prevents contaminating substances, such as sulphur compounds and metal ions, which occur on the surface of the silicon discs, from being diffused into the silicon. Such contaminating substances occur even after the silicon discs have been washed extremely carefully. Since the contaminating substances are prevented from diffusing into the silicon they cannot form recombination centres there for the holes and electrons and neither can they, due to ionisation, give rise to undesired alterations in resistivity.

The halogen, for example chlorine, bromine, iodine or fluorine, can be supplied to the container in free form but also, for example, in the form of an inorganic or organic compound which, under the conditions used for diffusion of the doping substance, dissociates to form free halogen. As a source for the formation of halogen it is also possible to use two or more compounds which react with each other to form halogen under the conditions necessary for carrying out the diffusion. Since at room temperature iodine is solid in its state of aggregation, it is simpler to supply iodine in free form to the container than the other halogens which in free form are liquid or gaseous. As examples of usable halogen compounds may be mentioned iodine trichloride, copper chloride, ferric chloride, gallium trichloride, gallium oxychloride and halogenated hydrocarbons. Particularly when diffusing gallium into silicon discs it may be suitable to use a gallium halogenide as a source for the formation of halogen.

The method according to the invention can be used not only when doping n-conducting silicon to form p-n-junctions and also to increase the impurity concentration of p-conducting silicon, but also, and with particularly good results, to improve the minority carrier life time of silicon discs which already contain p-conducting layers situated nearest the surfaces which have been effected by diffusing a doping substance from group III of the periodic system into the silicon discs.

The quantity of the halogen or halogen-producing compound or compounds is suitably so large that the concentration of halogen in the container during diffusion of the doping substance will be approximately $10^{-1}$–$10^{-3}$ mg./cm.$^3$, preferably approximately $5$–$10 \cdot 10^{-3}$ mg./cm.$^3$. There should be an excess of doping substance during the entire process.

BRIEF DESCRIPTION OF THE DRAWING

The invention will be more fully explained by describing examples with reference to the accompanying drawing which shows schematically in longitudinal section a means for performing the method according to the invention.

DESCRIPTION OF THE PREFERRED EMBODIMENTS

The silicon discs 1, which in the exemplified case are n-conducting and have a thickness of 300–800$\mu$, are arranged on the quartz rod 2 provided with slits (not shown), in the container consisting of the quartz ampule 3 which is tubular and closed at the ends by fusion. Inside the quartz ampule are the vaporizing sources 4 of the doping substance consisting of pieces of gallium arranged in suitable vessels and sources 5 of a halogen or a compound or several compounds which, when the quartz ampule 3 is later heated, generate halogen by thermic decomposition or by chemical reaction. In the exemplified case the sources 5 consist of gallium trichloride or gallium oxychloride or a mixture of these substances arranged in quartz crucibles. Before the quartz ampule is sealed it is filled with argon gas. The quartz ampule is then placed in a tube furnace and heated to a temperature of about 1250° C. for approximately 50 hours. A p-conducting layer is thus formed having a thickness of about 100$\mu$.

According to another embodiment the silicon discs consist of an n-conducting silicon which, on one or both sides, is provided with p-conducting layers approximately 100$\mu$ thick which have been effected in the normal manner by diffusing gallium into the discs, for example in a device according to FIG. 1 which is not equipped with the halogen sources 5, at a temperature of about 1250° C. for approximately 50 hours. According to the invention these silicon discs are placed in an arrangement according to FIG. 1, that is with the halogen sources 5 of the type previously mentioned, and treated after the quartz ampule 3 has been filled with argon gas and sealed at the ends, at about 1250° C. for a period of around 3 hours to improve their minority carrier life time.

The method according to the invention may also be used for diffusing other doping substances from group III of the periodic system, such as boron and aluminum, as well as for diffusing gallium into silicon discs.

We claim:

1. Method of diffusing a doping substance from group III of the periodic system into silicon discs for semiconductor devices, wherein the silicon discs are arranged in an inert atmosphere in a container comprising simultaneously subjecting said discs in said inert atmosphere to the action of a vapor from said doping substance at the diffusion temperature of the doping substance and to the action of a halogen, the concentration of the halogen in the container being between $10^{-1}$ and $10^{-3}$ mg./cm.$^3$.

2. Method according to claim 1, in which the halogen is supplied to the container in the form of free halogen.

3. Method according to claim 1, in which the halogen is supplied to the container in the form of a halogen compound which, under the conditions used for diffusion of the doping substance, dissociates to form free halogen.

4. Method according to claim 3, in which the halogen compound is selected from the group of gallium oxychloride and gallium trichloride.

5. Method according to claim 1, in which said silicon discs are provided at least on one side with a p-conducting layer containing a doping substance from group III of the periodic system diffused into the silicon discs.

References Cited

UNITED STATES PATENTS

| | | | |
|---|---|---|---|
| 3,178,798 | 4/1965 | Marinace | 148—189X |
| 3,228,812 | 1/1966 | Blake | 148—187 |
| 3,374,125 | 3/1968 | Goldsmith | 148—189 |
| 3,404,451 | 10/1968 | So | 148—187X |
| 3,442,725 | 5/1969 | Huffman et al. | 148—189 |

ALLEN B. CURTIS, Primary Examiner